M. E. KINTZ.
GARMENT FASTENER.
APPLICATION FILED FEB. 17, 1908.

992,362.

Patented May 16, 1911.

WITNESSES:
C. T. Beckly
M. F. McNiel

INVENTOR
Mary. E. Kintz
BY
T. J. Elliott
ATTORNEY

UNITED STATES PATENT OFFICE.

MARY E. KINTZ, OF TACOMA, WASHINGTON.

GARMENT-FASTENER.

992,362.  Specification of Letters Patent.  Patented May 16, 1911.

Application filed February 17, 1908. Serial No. 416,370.

*To all whom it may concern:*

Be it known that I, MARY E. KINTZ, a citizen of the United States of America, residing at Tacoma, in the county of Pierce and State of Washington, have invented certain new and useful Improvements in Garment-Fasteners, of which the following is a specification, reference being had therein to the accompanying drawing.

This invention relates to devices to be attached to garments and has for its object to provide a device to be removably hooked to the garment and in which the hook points are protected from contact with outside bodies by a shield portion of the body. I attain this object by the device illustrated in the accompanying drawing, in which—

Figure 1:
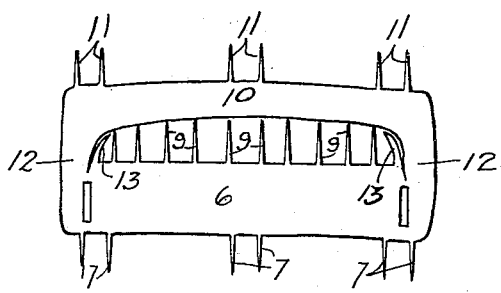
Figure 2:
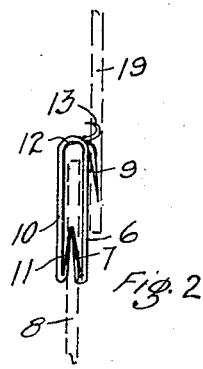

Figure 1 is a plan view of my device before being bent into operative shape; and Fig. 2 is a side view thereof, on an enlarged scale, when bent ready for use.

Similar numerals of reference refer to similar parts throughout the different views.

While my invention is best adapted for a skirt and waist fastener it is obvious that it could be used for connecting the meeting edges of various garments.

As shown in Fig. 1 of the drawing, my skirt supporter comprises a rectangular frame of sheet metal formed by the longitudinal portions 6 and 10 and the end portions 12. From the outer edges of portions 6 and 10 project a plurality of prongs 7 and 11, respectively, and from the inner edge of the portion 6 projects a series of straight prongs 9 and two curved terminal prongs 13.

In bending the frame to form the finished device, as shown in Fig. 2, the prongs 7 and 11 are first bent inwardly toward each other on the same side of the frame. The prongs 9 are then bent down toward the prongs 7, but on the opposite side of the plate 6. The prongs 13 remain approximately inbent, being only slightly deflected toward the same side of the frame as the prongs 9. Finally the frame is doubled upon itself by bending the portions 12 so that the portions 10 and 6 become parallel and the prongs 11 and 7 are in contact, as is clearly shown in Fig. 2.

In use as a skirt supporter, as shown in Fig. 2, a skirt 8 is inserted between the plates 10 and 6 and the prongs 7 and 11 are embedded in the material thereof by a downward pull. The prongs 9 are then hooked into the waist 19 and the curved prongs 13 hooked thereto above the prongs 9. The prongs 13 serve to keep the prongs 9 from becoming accidentally disengaged. As thus used, the device holds the skirt and waist securely together.

Having described my invention, what I claim is:

A device of the class described, comprising a single piece of sheet metal having the central portion cut away to form an open space adapted when bent to form two parallel plates connected together at each end of the open space; both of said plates having upwardly projecting prongs extending from their lower marginal edges, and one of said plates having upwardly and outwardly curved prongs from the upper marginal edge thereof and downwardly projecting prongs intermediate of said upwardly projecting prongs.

In testimony whereof I affix my signature in presence of two witnesses.

MARY E. KINTZ.

Witnesses:
 CORA F. BECKLY,
 M. F. McNEIL.

---

Copies of this patent may be obtained for five cents each, by addressing the "Commissioner of Patents, Washington, D. C."